SHIFT REGISTER INCORPORATING DELAY CIRCUIT

Filed June 27, 1956 2 Sheets-Sheet 1

INVENTOR.
JOHN PAUL JONES, JR.

INVENTOR.
JOHN PAUL JONES, JR 2,906,892
Patented Sept. 29, 1959

2,906,892

SHIFT REGISTER INCORPORATING DELAY CIRCUIT

John Paul Jones, Jr., Pottstown, Pa., assignor to Navigation Computer Corporation, a corporation of Pennsylvania Application June 27, 1956, Serial No. 594,293

8 Claims. (Cl. 307—88.5)

This invention relates in general to electrical delay circuits and in particular to information transfer circuits for use in shift register systems and the like.

It is well known in the electronic computer art that some means must be employed in shift register systems to temporarily delay or store the transfer information or signals while the advance or clearing operation is taking place. Various means have been employed in the past to perform this function. One way is to use the storage properties of a capacitor, but this method has serious frequency limitations. Another alternative is to employ LC delay lines. LC delay lines, however, are relatively bulky and expensive and are difficult to design satisfactorily for this purpose. Magnetic cores may also be used but are unsatisfactory for use with high impedance bistable units such as the transistor bistable multivibrator circuit or flip-flop. In addition, the magnetic core delay is prone to reading back to the prior stage during the information read-out period which is undesirable. Ideally, the storage or delay means should not be subject to these disadvantages and should be phase discriminating to the driver source.

It is, accordingly an object of this invention to provide improved electrical delay or storage means for shift register systems and the like.

It is another object of this invention to provide improved high impedance electrical delay means for use with high impedance transistor bistable circuits.

It is yet another object of this invention to provide an improved electrical delay circuit for use with high speed shift register systems which is phase discriminating and nondisturbing to the driver source.

It is still another object of the present invention to provide improved high-impedance electrical delay means which is relatively simple and inexpensive and the output impedance of which is capable of being varied.

In accordance with the invention, the transient output voltage of a shift register bistable circuit is differentiated to provide a voltage pulse. This pulse is of proper polarity to render a unilateral conducting element, such as a diode, conductive. The diode is connected in series with an inductor. Conduction of the diode causes a flux change in the inductor and as the inductor discharges, a voltage pulse of an opposite polarity to the transient voltage is produced. This voltage, which is delayed a discrete amount from the transient voltage, is applied to the next bistable circuit and serves to transfer the output information to it from the preceding bistable circuit.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
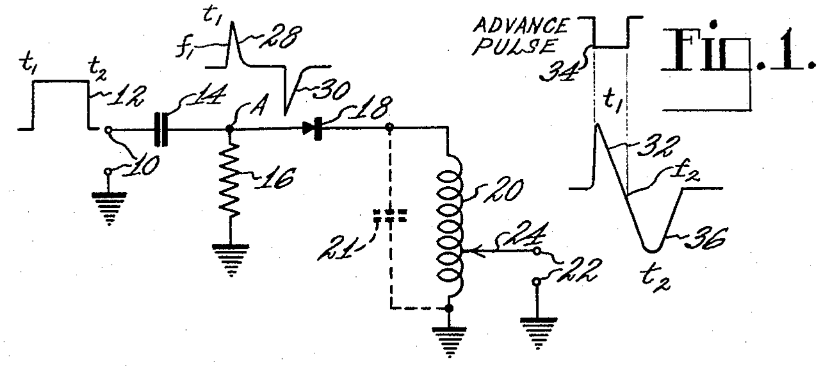
Figure 1 is a schematic circuit diagram of an information storage or delay circuit embodying the invention.

Referring now to the drawing wherein like parts are indicated by like reference numerals through the figures, and referring particularly to Figure 1, a delay or storage circuit embodying the invention includes a pair of input terminals 10 to which a transient square-wave input pulse 12 is applied. One of the input terminals 10 is grounded and the ungrounded input terminal is connected with one plate of a capacitor 14, which typically may have a capacitance of 100 micromicrofarads and comprises with a resistor 16 a differentiating network. The resistor 16 is connected from the other plate of the capacitor 14 to ground and may typically have a resistance value of 8200 ohms, for example. A junction diode 18, of the commercial 1N34A type, for example, is connected from the junction of the resistor 16 and capacitor 14 through an inductor 20 to ground. The interwinding capacity of the inductor 20 is illustrated by a shunt capacitor 21. The circuit is completed by a pair of output terminals 22, one of which is grounded as shown. The ungrounded output terminal is connected to a variable tap 24 on the inductor 22. By varying the position of the tap 24 the output impedance of the delay circuit may be varied, which makes the delay circuit versatile.

The switching transient pulse 12 may be the output of a bistable diode and is very rapid. The positive transient at time $t_1$ causes the information transfer. The information transfer is taking place at time $t_2$, and the negative transient occurs at approximately time $t_2$. In operation, the differentiating network comprising the capacitor 14 and the resistor 16 differentiates the transients and causes a positive and negative pulse 28 and 30, respectively, to be developed at point A in the circuit. The diode 18 is poled in the circuit so that it will conduct when a positive pulse is developed at point A. Thus the differentiated positive pulse 28 causes the diode 18 to conduct. Accordingly, the current flow in the inductor 20 causes its magnetic flux to vary, providing a peak positive voltage at time $t_1$ as indicated by the positive voltage pulse 32. The inductor 20 and its associated interwinding capacity 21 then discharge at the resonant frequency (frequency $f_2$) of the inductor 20 and capacitor 21. This discharge is designed to occur so that the voltage across the inductor 20 is zero at the end of the advance pulse 34 period. The discharging of the inductor 20 and the capacitor 21 through the diode 18 and the differentiating resistor 16, which serves as a load, produces a negative output pulse 36, which reaches a peak value at time $t_2$. This is the read-out pulse, and is of an opposite polarity (i.e., negative in this case) from the information which is applied to the circuit. The differentiating network comprising the capacitor 14 and the resistor 16 is designed to respond to only the very high frequency (frequency $f_1$) components at time $t_1$. The resonant discharge frequency ($f_2$) of the inductor 20 and the capacitor 21 is much lower than the frequency $f_1$. Accordingly, the pulses at the output will not be disturbing to the driving source because of this frequency differential.

Figure 2:
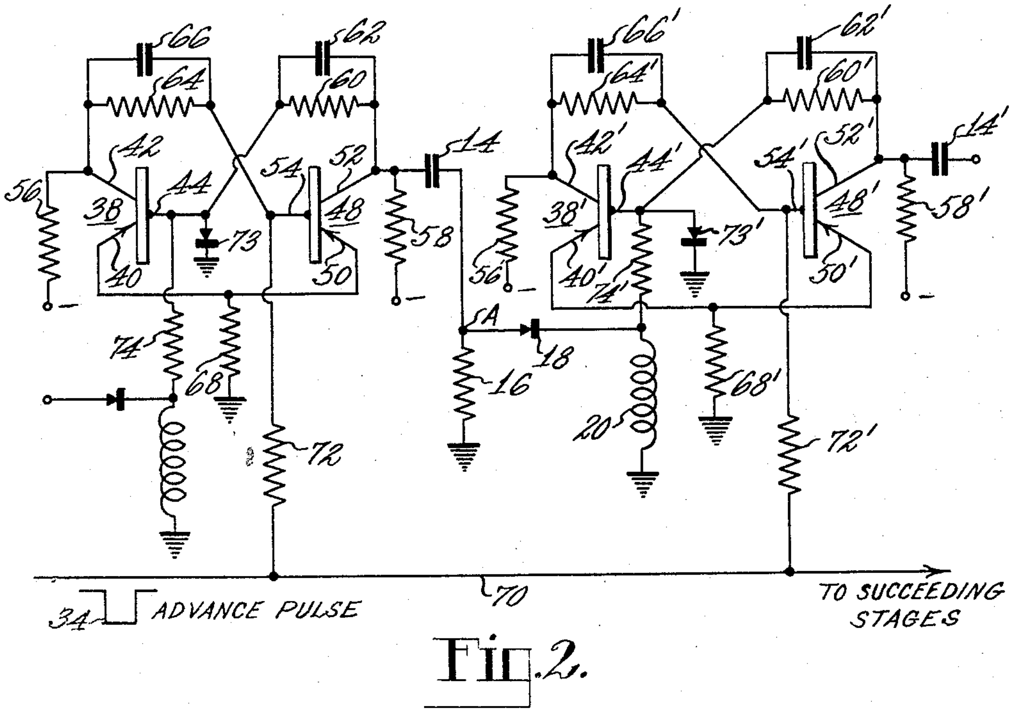
Figure 2 is a schematic circuit diagram of a portion of a shift register system employing a delay circuit of the type illustrated in Figure 1 embodying the invention.

In Figure 2, two stages of a multi-stage shift register system includes a pair of substantially identical bistable multivibrator circuits or flip-flops. Similar components in the right hand or second stage flip-flop have been given primed (′) reference numerals, which correspond to the same components or elements in the left-hand or first stage flip-flop. The first stage flip-flop includes a pair of transistors 38 and 48, each of which may be considered to be, by way of example, junction transistors of the P–N–P type. The transistor 38 has an emitter 40, a collector 42, and a base electrode 44. Similarly, the transistor 48 has an emitter 50, a collector 52, and a base electrode 54. The collector electrodes 42 and 52 are coupled through direct-current conductive load impedance elements, illustrated as a pair of resistors 56 and 58, respectively, to the negative terminal of a suitable source of energizing potential, such as a negative 20 volt direct-current supply, for example. The base 44 of the transistor 38 is coupled to the collector 52 of the transistor 48 through the parallel combination of a coupling resistor 60 and capacitor 62. The base 54 of the transistor 48 is coupled to the collector 42 of the transistor 38 through the parallel combination of a coupling resistor 64 and capacitor 66, thereby providing regenerative bistable operation. The emitter electrodes 40 and 50 are connected to a point of reference potential or ground through a resistor 68. The application of signals to the base 44 of the transistor 38 will trigger the bistable multivibrator circuit from an "on" or non-indicating state to an "off" or indicating state and vice-versa. The circuit also includes an advance pulse bus 70 which is connected through coupling resistors 72 and 72′ to the base electrodes 54 and 54′.

To prevent the read-out transient on the collector electrodes 52 and 52′ from storing information in their own input transfer circuits or across the delay line inductors, diodes 73 and 73′ are connected from the base electrodes 44 and 44′ to ground. During the advance or clearing period, a positive pulse would normally appear on the base electrodes 44 and 44′ and would affect the delay network inductors in much the same manner as the information through the delay network capacitor from the prior stage. The diodes 73 and 73′ cause this undesired voltage to be dropped across the resistors 60 and 60′.

In accordance with the invention, information transfer between separate multivibrator circuits is provided by connecting a delay circuit of the type illustrated in Figure 1 between the collector 52 of the second transistor 48 of the first flip-flop stage to the base 44′ of the first transistor 38′ of the second flip-flop stage. Thus in Figure 2, the collector 52 is connected through the capacitor 14 and the diode 18 to the ungrounded terminal of the inductor 20. The resistor 16, which comprises with the capacitor 14 a differentiating network, is connected from the junction of the capacitor 14 and the diode 18 to ground. The ungrounded terminal of the inductor 20 is connected through a resistor 74′ to the base 44′ of the transistor 38′.

The collector electrodes 52 and 52′ of the transistors 48 and 48′, respectively, are the so-called "read-out" points of each of the flip-flops, and are the points where the state of the flip-flop is designated. When, for example, the transistors 48 or 48′ are conducting they will be considered to be in the "0" state. If the flip-flop circuit is retaining a "1" then the collector electrode of the indicating transistor, i.e., the transistors 48 and 48′, will be non-conductive or at the potential of the negative direct-current supply source. The application of the negative advance pulse 34 to the base electrodes 54 and 54′ of the transistors 48 and 48′ will cause each of these transistors to "clear" to the "0" state. That is, each of the transistors 48 and 48′ will become conductive upon application of a negative advance pulse to their base electrodes. Thus the positive voltage transient 12 is provided at the collector electrodes 52 and 52′ of the transistors 48 and 48′ when they become conductive. These positive voltage transients comprise the read-out information for the next succeeding flip-flop circuit and are effective to set the next succeeding flip-flop to the "1" state. Through this action the information which is stored in the register is transferred from bit to bit and the information is retained in the stages between the advance pulses.

Insofar as the present invention is concerned, it should be noted that when the advance pulse 34 is resetting the flip-flops to the "0" state, and a "1" bit of information is being transferred to the following flip-flop, it would be impossible to be reading a "1" into a flip-flop at the same time that this flip-flop is being cleared to the "0" state. Accordingly, it is necessary to the proper operation of the system that some delay means be used between flip-flop stages to store or retain the transfer information while the advance or clearing operation is taking place. In accordance with this invention, a delay circuit of the type illustrated in Figure 1 accomplishes this end and has among others, the advantages of being of a high impedance, and phase discriminating and non-disturbing to the driver source. These advantages are realized, moreover, with a relatively simple and inexpensive circuit.

Figure 3:
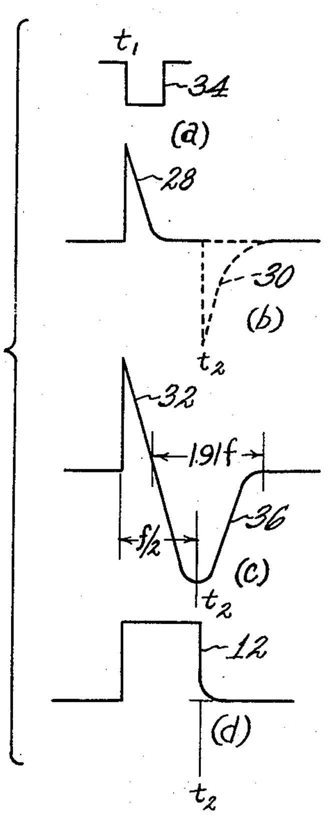
Figure 3 is a graph illustrating various voltage waveforms of circuits embodying the invention.

The operation of a delay circuit in accordance with the invention and as embodied in a shift register system of the type illustrated in Figure 2 will be best understood from a consideration of the waveforms illustrated in Figure 3. It is assumed that each of the flip-flops is in the "1" state, that is that each of the right hand transistors 48 and 48′ is non-conductive. The waveform 34 (Figure 3*a*) is the negative advance pulse. This pulse starts at the time $t_1$ and will have a duration normally of approximately one to two microseconds. The advance pulse 34 is applied to the base electrodes 54 and 54′ of each of the right hand transistors 48 and 48′ and will cause them to conduct. Thus a positive transient 12 (Figure 3*d*) is produced at the collectors 52 and 52′. This positive transient is differentiated, as was explained in connection with Figure 1, by the differentiating network comprising the capacitor 14 and the resistor 16. This provides a positive voltage pulse 28, and a negative pulse 30, depending on whether the prior stage is receiving a "1" bit of information, that is only if the transistor 48 is non-conductive after being conductive. At any rate, the negative pulse, if it is produced, is isolated from the following stage by the diode 18.

As was explained hereinbefore, the diode 18 conducts current when the differentiated positive pulse 28 is applied to it. Thus, through the flux change in the inductor 20 and the subsequent discharge of the inductor, a voltage waveform of the type illustrated in Figure 3*c* is produced across the inductor 20. The inductor 20 discharges its energy through the resistors 16 and 74′ in parallel. The natural resonant frequency of the inductor 20 and its interwinding capacity 21 is chosen to be twice the pulse interval time required for the discrete delay between time $t_1$ and output time $t_2$. This is indicated by $f/2$ on the waveform shown in Figure 3*c*. If the resistance of the resistors are chosen to provide proper damping, the overshoot period of the inductor will take approximately 1.91 times the half-frequency interval.

The delay circuit embodying the invention thus responds to a read-out pulse at time $t_1$ to provide a negative waveform 36 at time $t_2$. Thus, for example, if both flip-flops were in the "1" state prior to the application of an advance pulse, the application of the advance pulse 34 will drive them into the "0" state at time $t_1$. At time $t_2$, however, the waveform 36 is applied to the base electrodes of each of the left hand transistors, in this case the base electrodes 44 and 44′ of the transistors 38 and 38′, respectively. The application of the negative wave 36 to these base electrodes will cause the transistors 38 and 38′ to conduct and through the cross-coupling shown render each of the right hand transistors 48 and 48′ non-conductive. The flip-flops are thus returned to the "1" state until the next advance pulse is received and the cycle repeats. Since the frequency response of the differentiating network and the resonant frequency of the inductor 20 and its interwinding capacity 21 are widely different, the pulses will not read-back to the driver source. The delay circuit also is of a high impedance and this impedance may be varied by varying the tap point on the inductor 20. Further advantages of the delay circuit include its relative insensitivity to wide voltage variations and to component value changes.

A delay or information transfer circuit embodying the invention is thus characterized by a high impedance and is phase discriminating and non-disturbing to the driver source. Possessing these characteristics, the delay circuit described is ideally suited for information transfer between the bistable transistor circuits of a shift register system.

What is claimed is:

1. In a shift register system the combination with at least a pair of relatively high impedance bistable circuits each having an input and an output circuit, and means for applying advance pulses to said bistable circuits, of an information transfer circuit coupled between the output circuit of one of said bistable circuits and the input circuit of the other of said bistable circuits comprising: differentiating means for differentiating voltage transients during one electrical state of said one of said bistable circuits, a unilateral conducting element connected with said differentiating means and adapted to be rendered conductive in response to differentiated pulses of one polarity, an inductor connected in series between said unilateral conducting element and a point of reference potential in said circuit to provide a flux change in response to conduction of said element and a delayed voltage pulse of an opposite polarity, and conductive means connecting a point intermediate said unilateral conducting element and said inductor with the input circuit of said other bistable circuit to apply said delayed voltage pulse thereto and alter the electrical state thereof.

2. A shift register system as defined in claim 1 wherein each of said bistable circuits comprises a multivibrator circuit including a pair of transistors.

3. A shift register system as defined in claim 2 wherein each of said transistors includes a base, an emitter, and a collector electrode, and wherein the output circuit of each of said bistable circuits comprises the collector electrode of one of each of said pair of transistors, and the input circuit of each of said bistable circuits comprises the base electrode of the other of each of said pair of transistors.

4. In a shift register system the combination with a first bistable multivibrator circuit including a first pair of transistors each including a base, an emitter, and a collector electrode, means cross-coupling the base and collector electrodes of said transistors to provide regenerative bistable circuit operation and two electrical states of said first multivibrator circuit, a second bistable multivibrator circuit including a second pair of transistors each including a base, an emitter, and a collector electrode, means cross-coupling the base and collector electrodes of said second pair of transistors to provide regenerative bistable circuit operation and two electrical states of said second multivibrator circuit, and means for applying advance pulses to each of said bistable circuits, of a delay network connecting the collector electrode of said one of said first pair of transistors with the base electrode of the other of said second pair of transistors comprising: a differentiating network including a capacitor and a resistor connected with the collector electrode of said one of said first pair of transistors for differentiating voltage transients during one of the electrical states of said first multivibrator circuit, a diode connected in series with said capacitor and poled in said circuit to be rendered conductive in response to differentiated pulses of one polarity, an inductor in series between said diode and a point of reference potential in said circuit and having a resonant frequency lower than the frequency response of said differentiating network and providing a flux change in response to conduction of said diode and a delayed voltage pulse of an opposite polarity, and conductive means connecting a point intermediate said diode and said inductor with the base electrode of the other of said second pair of transistors to apply said delayed voltage pulse thereto to alter the electrical state of said second multivibrator circuit.

5. A delay circuit comprising, in combination, an input terminal for applying a voltage transient to said delay circuit, a differentiating network connected with said input terminal for differentiating said voltage transient, a diode connected with said differentiating network and poled in said circuit to be rendered conductive in response to differentiated pulses of one polarity, an inductor connected in series between said diode and a point of reference potential to provide a flux change and discharge in response to conduction of said diode and a delayed voltage pulse of an opposite polarity, and output circuit means connected from a point intermediate said diode and said inductor for deriving said delayed voltage pulse from across said inductor.

6. A delay circuit as defined in claim 5 wherein the connection of said output circuit means with said inductor is variable to vary the impedance of said delay circuit.

7. A delay circuit as defined in claim 6 wherein the resonant discharge frequency of said inductor is lower than the frequency response of said differentiating network.

8. A shift register system comprising, in combination, a first transistor multivibrator having two electrical states and including a first pair of transistors each having a collector, an emitter, and a base electrode, a second multivibrator circuit having two electrical states and including a second pair of transistors each having a collector, an emitter, and a base electrode, a differentiating network connected with the collector electrode of one of said transistors of said first multivibrator circuit for differentiating voltage transients during one electrical state of said first multivibrator circuit, a unilateral conducting element connected with said differentiating network and poled in said system to be rendered conductive in response to differentiated pulses of one polarity, an inductor connected in series between said unilateral conducting element and a point of reference potential in said system to provide a flux change and discharge of stored electrical energy in response to conduction of said element whereby a delayed voltage pulse of an opposite polarity is produced across said inductor, and means connecting a point intermediate said unilateral conducting element and said inductor with the base electrode of one of said transistors of said second multivibrator circuit to apply said delayed voltage pulse thereto and change the electrical state of said second multivibrator circuit.

References Cited in the file of this patent

UNITED STATES PATENTS

| | | |
|---|---|---|
| 2,515,195 | Clark | July 18, 1950 |
| 2,594,336 | Mohr | Apr. 29, 1952 |
| 2,601,089 | Burkhart | June 17, 1952 |
| 2,620,448 | Wallace | Dec. 2, 1952 |
| 2,634,052 | Bloch | Apr. 7, 1953 |
| 2,673,936 | Harris | Mar. 30, 1954 |

OTHER REFERENCES

R. F. Shea: Principles of Transistor Circuits (1953), published by John Wiley & Sons, Inc., pp. 290–91.